(12) United States Patent
Emmes et al.

(10) Patent No.: US 7,529,886 B2
(45) Date of Patent: May 5, 2009

(54) METHOD, SYSTEM AND STORAGE MEDIUM FOR LOCKLESS INFINIBAND™ POLL FOR I/O COMPLETION

(75) Inventors: David B. Emmes, Wappingers Falls, NY (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 10/980,036

(22) Filed: Nov. 3, 2004

(65) Prior Publication Data

US 2006/0095606 A1    May 4, 2006

(51) Int. Cl.
G06F 12/00 (2006.01)
G06F 13/00 (2006.01)
G06F 13/28 (2006.01)

(52) U.S. Cl. ............ 711/114; 710/20; 710/21; 710/52; 711/150; 711/168

(58) Field of Classification Search ............ 711/114, 711/150, 168; 710/20, 21, 52
See application file for complete search history.

(56) References Cited

U.S. PATENT DOCUMENTS

| | | | |
|---|---|---|---|
| 5,590,288 A | 12/1996 | Castor et al. | |
| 5,978,857 A | 11/1999 | Graham | |
| 6,353,869 B1 | 3/2002 | Ofer et al. | |
| 6,457,064 B1 | 9/2002 | Huff et al. | |
| 6,697,927 B2* | 2/2004 | Bonola | 711/168 |
| 2002/0073257 A1* | 6/2002 | Beukema et al. | 710/105 |
| 2004/0202189 A1 | 10/2004 | Arndt et al. | |
| 2005/0018669 A1 | 1/2005 | Arndt et al. | 370/389 |

OTHER PUBLICATIONS

Infiniband ™ Architecture Release 1.085 vol. 1—General Specifications pp. 549-553, Jun. 14, 2002.

* cited by examiner

*Primary Examiner*—Alford W Kindred
*Assistant Examiner*—Chun-Kuan Lee
(74) *Attorney, Agent, or Firm*—Cantor Colburn LLP; William Kinnaman, Jr.

(57) ABSTRACT

A method, system, and storage medium for the InfiniBand™ Poll verb to support a multi-threaded environment without the use of kernel services to provide serialization for mainline Poll logic. Poll is the verb, which allows a consumer to determine which of its work requests have completed, and provides ending status. In addition to multiple concurrent threads using Poll against a single Completion Queue, Poll is serialized with Destroy Queue Pair and Destroy Completion Queue. Completion Queues are used to maintain completion status for work requests. Queue Pairs are used to submit work requests and are related to a Completion Queue at the time they are created.

7 Claims, 7 Drawing Sheets

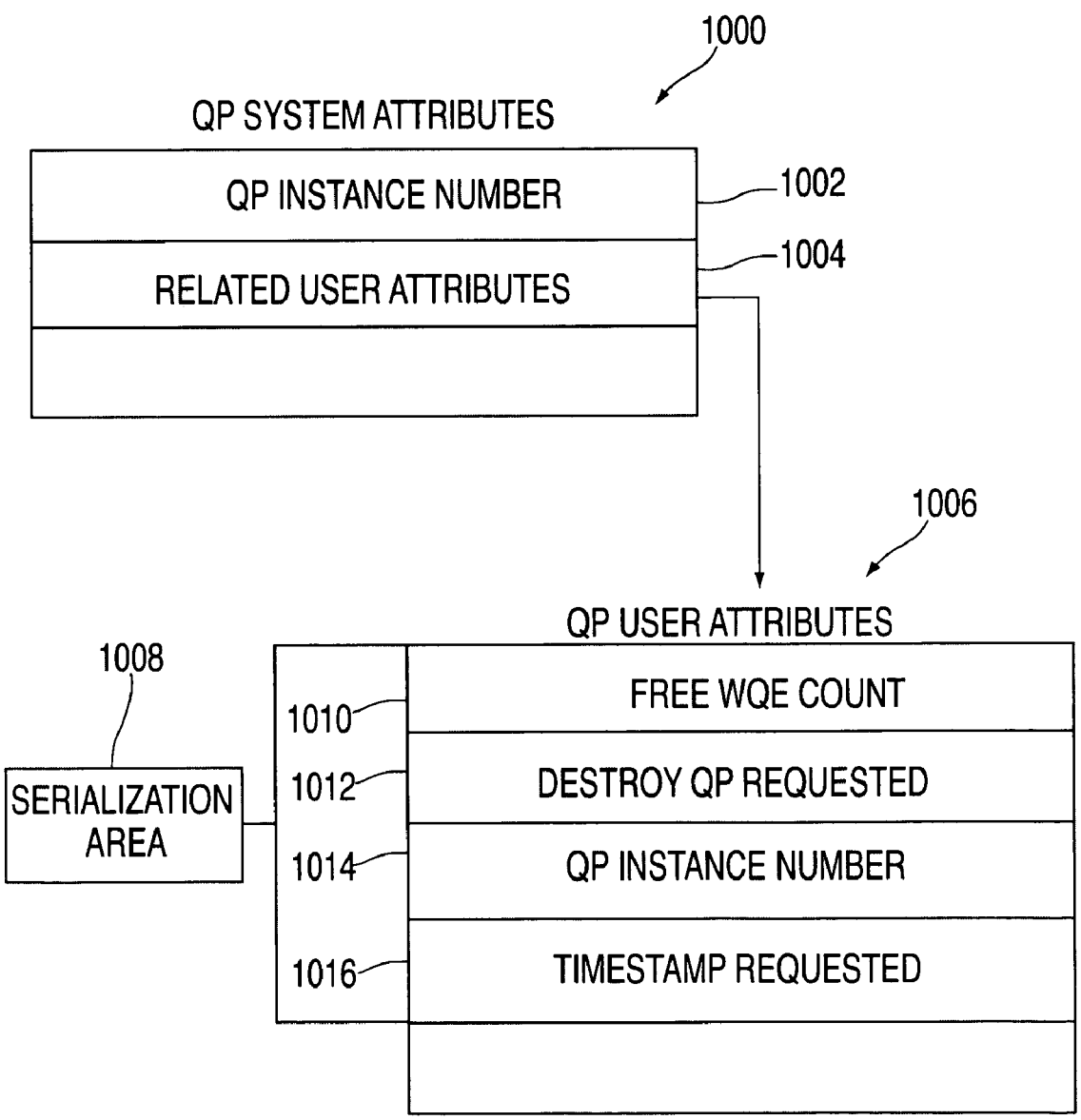

US 7,529,886 B2

METHOD, SYSTEM AND STORAGE MEDIUM FOR LOCKLESS INFINIBAND™ POLL FOR I/O COMPLETION

BACKGROUND OF THE INVENTION

1. Field of the Invention

The present disclosure relates generally to computer and processor architecture, storage management, input/output (I/O) processing, operating systems and in particular, to a method, system, and storage medium for the InfiniBand™ Poll verb to support a multi-threaded environment without the use of kernel services to provide serialization for mainline Poll logic.

2. Description of the Related Art

In a typical operating system environment, such as z/OS, OS/390, and predecessor versions, input/output (I/O) completion processing requires kernel code to service an I/O interrupt, analyze the completion status, and give control to exits that execute in kernel mode.

The use of interrupts is disruptive to application processing due to pollution of local hardware caches used to improve performance of the processor storage hierarchy, the hardware serialization incurred for interrupt processing, and the instructions required in the kernel to service the interrupt. Provision of exits that execute in kernel mode requires a degree of expertise and a level of authorization that is undesirable for application writers.

The InfiniBand™ Architecture Specification is a standard that is available from the InfiniBand® Trade Association. The InfiniBand™ Architecture Specification defines an alternative approach to I/O processing that allows more direct use of I/O facilities by an application.

InfiniBand™ provides a hardware message passing mechanism which can be used mechanism that can be used for I/O devices and Interprocess Communications (IPC) between general computing nodes. Consumers access InfiniBand™ message passing hardware by posting send/receive messages to send/receive work queues on an InfiniBand™ Channel Adapter (CA). The send/receive work queues (WQ) are assigned to a consumer as a Queue Pair (QP). Consumers retrieve the results of these messages from a Completion Queue (CQ) through InfiniBand™ send and receive work completions (WC).

The source CA takes care of segmenting outbound messages and sending them to the destination. The destination CA takes care of reassembling inbound messages and placing them in the memory space designated by the destination's consumer. There are two CA types: Host CA and Target CA. The Host Channel Adapter (HCA) is used by general purpose computing nodes to access the InfiniBand™ fabric. Consumers use InfiniBand™ verbs to access Host CA functions. The software that interprets verbs and directly accesses the CA is known as the Channel Interface (CI).

The Poll verb allows an application to determine which of its work requests have completed and provides ending status. This Poll verb is defined to execute in user mode, i.e., it does not require kernel intervention. In order to properly serialize use of the resources related to the work request, current processing uses kernel serialization services to provide disabled spin locks. Even in an enabled environment, such as would be expected in an InfiniBand™-enabled environment, use of kernel serialization services would be expected, as for example to utilize latches. The use of latches would impose a performance penalty on the Poll verb and would also require some recovery logic to track the ownership of the latch while it is held.

The Poll verb interacts with other verbs and there are some problems in supporting the Poll verb for a multithreaded environment. For example, multiple consumers running independently and possibly at the same instant in time could be requesting the Poll service against the same Completion Queue, creating a serialization problem. There is a need for a Poll service invokable in user mode without using kernel serialization services.

BRIEF SUMMARY OF THE INVENTION

The present invention is directed to a method, system, and storage medium for the InfiniBand™ Poll verb to support a multi-threaded environment without the use of kernel services to provide serialization for mainline Poll logic.

One aspect is a method for lockless InfiniBand™ Poll for I/O completion. Shared access is provided to completion queue resources for multiple concurrent threads performing Poll logic. It is determined if any thread is attempting to destroy the completion queue resources and, if so, an error status is returned. Serialization for mainline Poll logic is provided without using kernel services.

Another aspect is a computer-readable storage medium having instructions stored thereon to perform a method for lockless InfiniBand™ Poll for I/O completion. Shared access is provided to completion queue resources for multiple concurrent threads performing Poll logic. It is determined if any thread is attempting to destroy the completion queue resources and, if so, an error status is returned. Serialization for mainline Poll logic is provided without using kernel services.

Yet another aspect is system for lockless InfiniBand™ Poll for I/O completion, including completion queue system attributes, including a completion queue related user attributes pointer, completion queue user attributes being located by the completion queue related user attributes pointer, a completion queue having at least one completion queue element, a completion queue handle, queue pair system attributes, and queue pair user attributes being located by the related queue pair user attributes pointer. Shared access is provided for the completion queue for multiple concurrent threads performing Poll logic. An error status is returned if any thread is attempting to destroy the completion queue resources. Serialization for mainline Poll logic is provided without using kernel services.

BRIEF DESCRIPTION OF THE DRAWINGS

These and other features, aspects, and advantages of the present invention will become better understood with regard to the following description, appended claims, and accompanying drawings, where:

FIG. 9 is a block diagram of an exemplary HCA free CQ count register according to embodiments of the present invention; and FIG. 10 is a block diagram of exemplary QP system attributes and user attributes according to embodiments of the present invention.

DETAILED DESCRIPTION OF THE INVENTION

Exemplary embodiments of the present invention provide a method, system, and storage medium for the InfiniBand™ Poll verb to support a multi-threaded environment without the use of kernel services to provide serialization for mainline Poll logic. Exemplary embodiments are preferably implemented in a distributed computing system, such as a prior art system area network (SAN) having end nodes, switches, routers, and links interconnecting these components. FIGS. 1-4 show various parts of an exemplary operating environment for embodiments of the present invention. FIGS. 5-10 show exemplary embodiments of the present invention.

Figure 1:
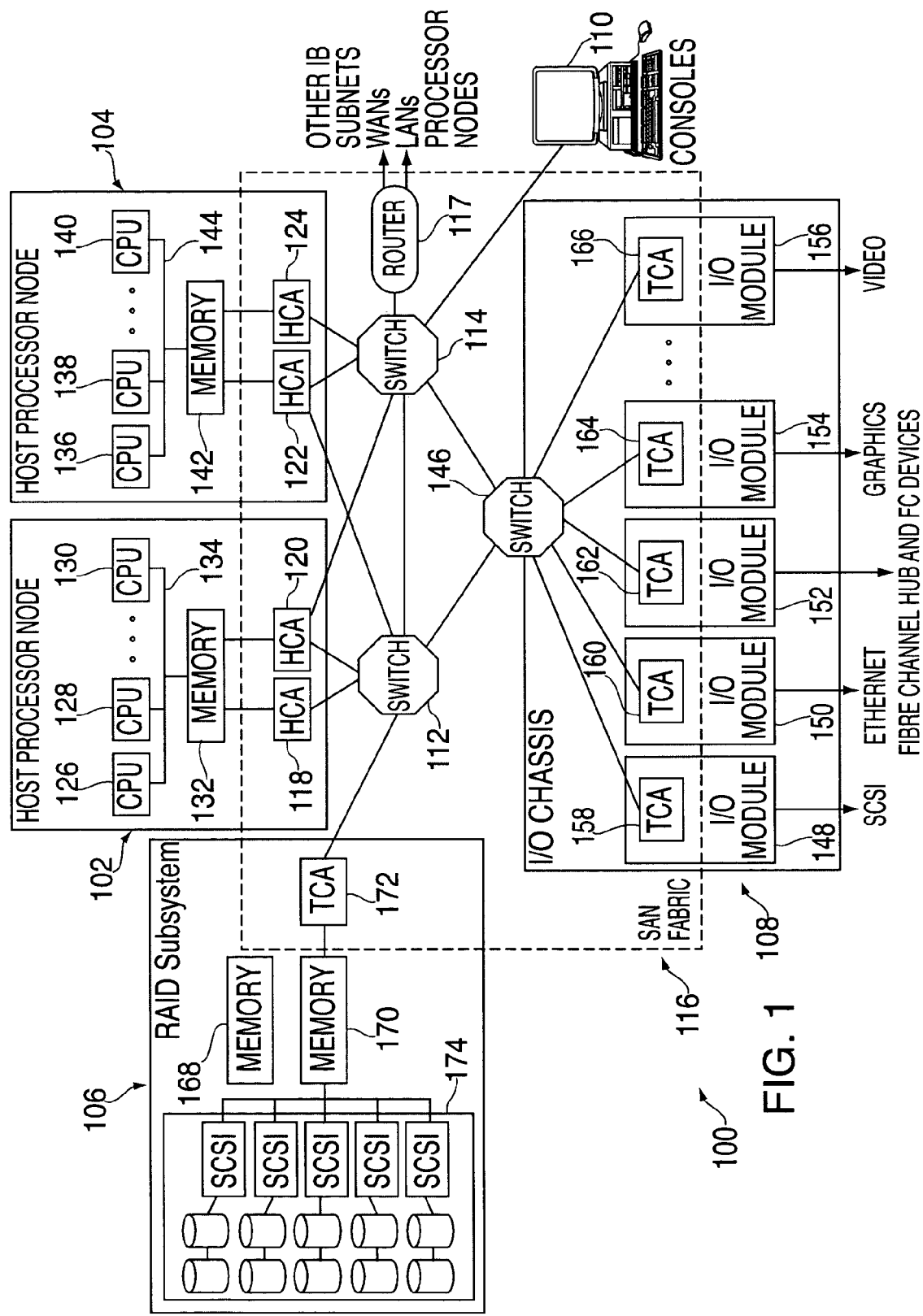
FIG. 1 is a diagram of a distributed computer system in the prior art that is an exemplary operating environment for embodiments of the present invention.

FIG. 1 is a diagram of a distributed computer system in the prior art that is an exemplary operating environment for embodiments of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data for ensuring packets are not delivered with corrupted contents.

SAN 100 contains the communications and management infrastructure supporting both I/O and inter-processor communications (IPC) within a distributed computer system. The SAN 100 shown in FIG. 1 includes a switched communications fabric 116, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 116. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and inter-processor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and inter-processor communications. SAN 100 supports high-bandwidth and scalability required for I/O and also supports the extremely low latency and low CPU overhead required for inter-processor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and inter-processor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
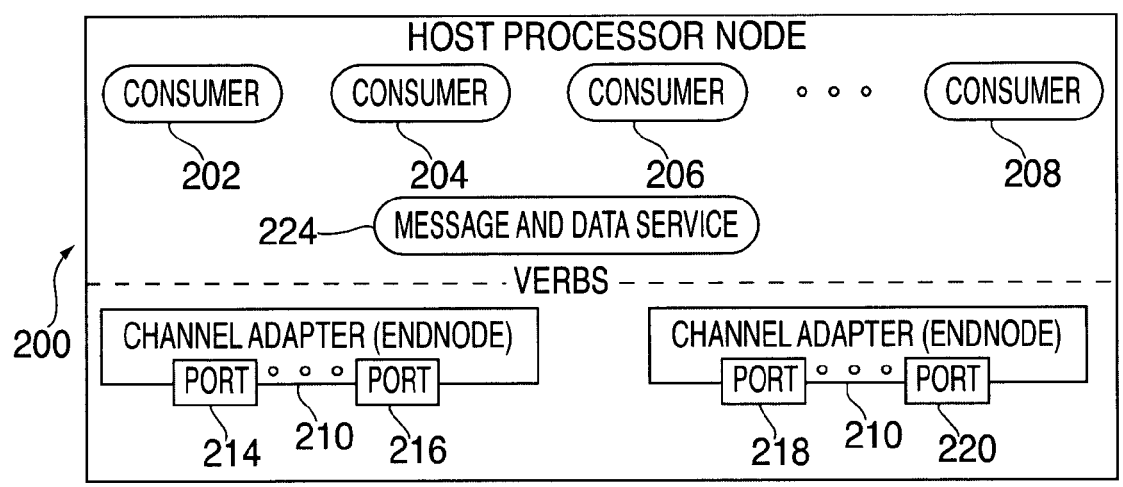
FIG. 2 is a functional block diagram of a host processor node in the prior art that is part of an exemplary operating environment for embodiments of the present invention.

Turning next to FIG. 2, a functional block diagram of a host processor node in the prior art that is part of an exemplary operating environment for embodiments of the present invention is depicted. Host processor node 200 is an example of a host processor node, such as host processor node 102 in FIG. 1.

In this example, host processor node 200 shown in FIG. 2 includes a set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202-208 to process messages and other data.

Figure 3:
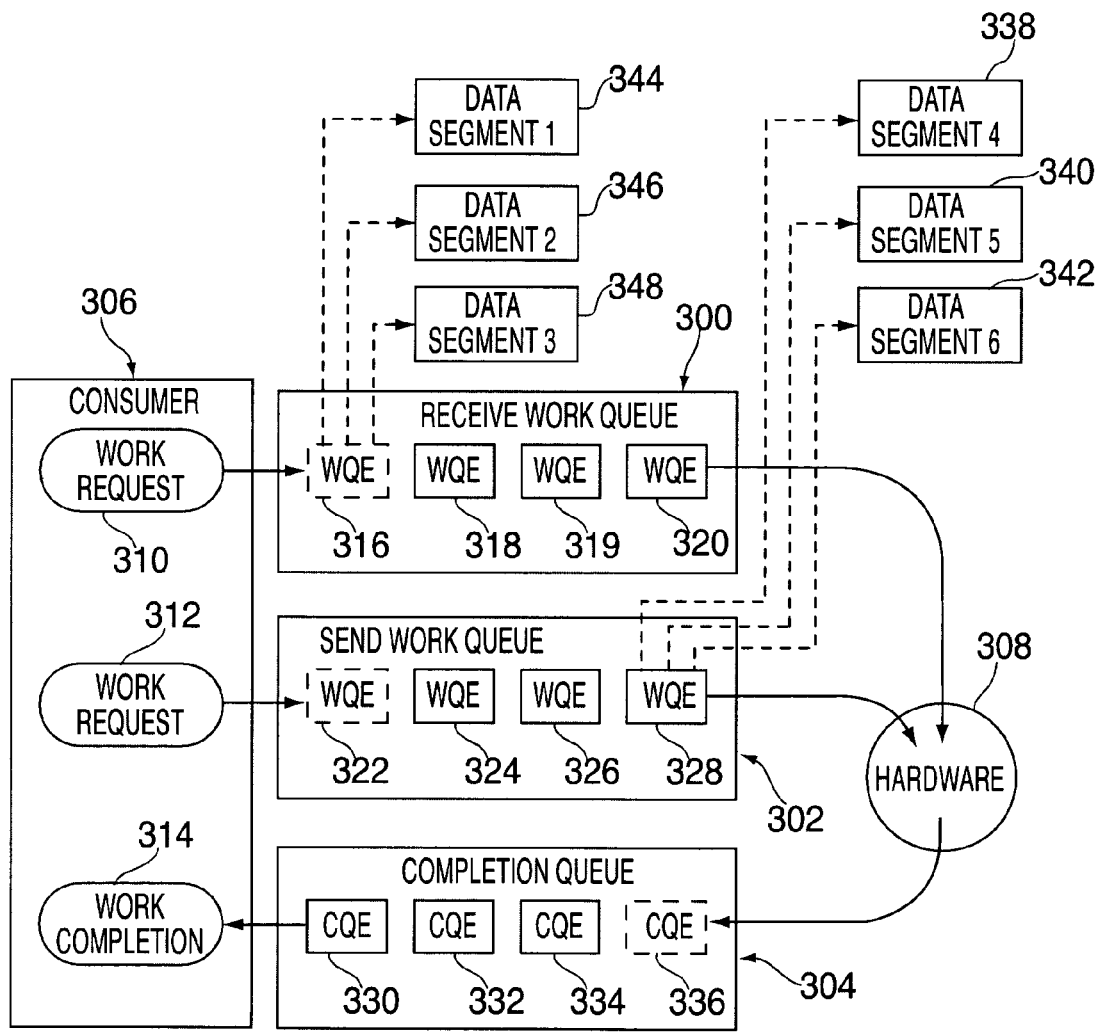
FIG. 3 is a diagram illustrating processing of work requests in the prior art that is part of an exemplary operating environment for embodiments of the present invention.

With reference now to FIG. 3, a diagram illustrating processing of work requests in the prior art that is part of an exemplary operating environment for embodiments of the present invention is depicted. In FIG. 3, a receive work queue 300, send work queue 302, and completion queue 304 are present for processing requests from and for consumer 306. These requests from consumer 302 are eventually sent to hardware 308. In this example, consumer 306 generates work requests 310 and 312 and receives work completion 314. As shown in FIG. 3, work requests placed onto a work queue are referred to as work queue elements (WQEs).

Send work queue 302 contains work queue elements (WQEs) 322-328, describing data to be transmitted on the SAN fabric. Receive work queue 300 contains work queue elements (WQEs) 316-320, describing where to place incoming channel semantic data from the SAN fabric. A work queue element is processed by hardware 308 in the host channel adapter.

The verbs also provide a mechanism for retrieving completed work from completion queue 304. As shown in FIG. 3, completion queue 304 contains completion queue elements (CQEs) 330-336. Completion queue elements contain information about previously completed work queue elements. Completion queue 304 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 302 shown in FIG. 3 are as follows. A send work request is a channel semantic operation to push a set of local data segments to the data segments referenced by a remote node's receive work queue element. For example, work queue element 328 contains references to data segment 4 338, data segment 5 340, and data segment 6 342. Each of the send work request's data segments contains a virtually contiguous memory space. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 316 in receive work queue 300 references data segment 1 344, data segment 2 346, and data segment 3 348. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 300 shown in FIG. 3 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For inter-processor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIG. 3. The client process calls an operating-system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination end node resides on a remote subnet.

If a reliable transport service is employed, when a request data packet reaches its destination end node, acknowledgment data packets are used by the destination end node to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 4:
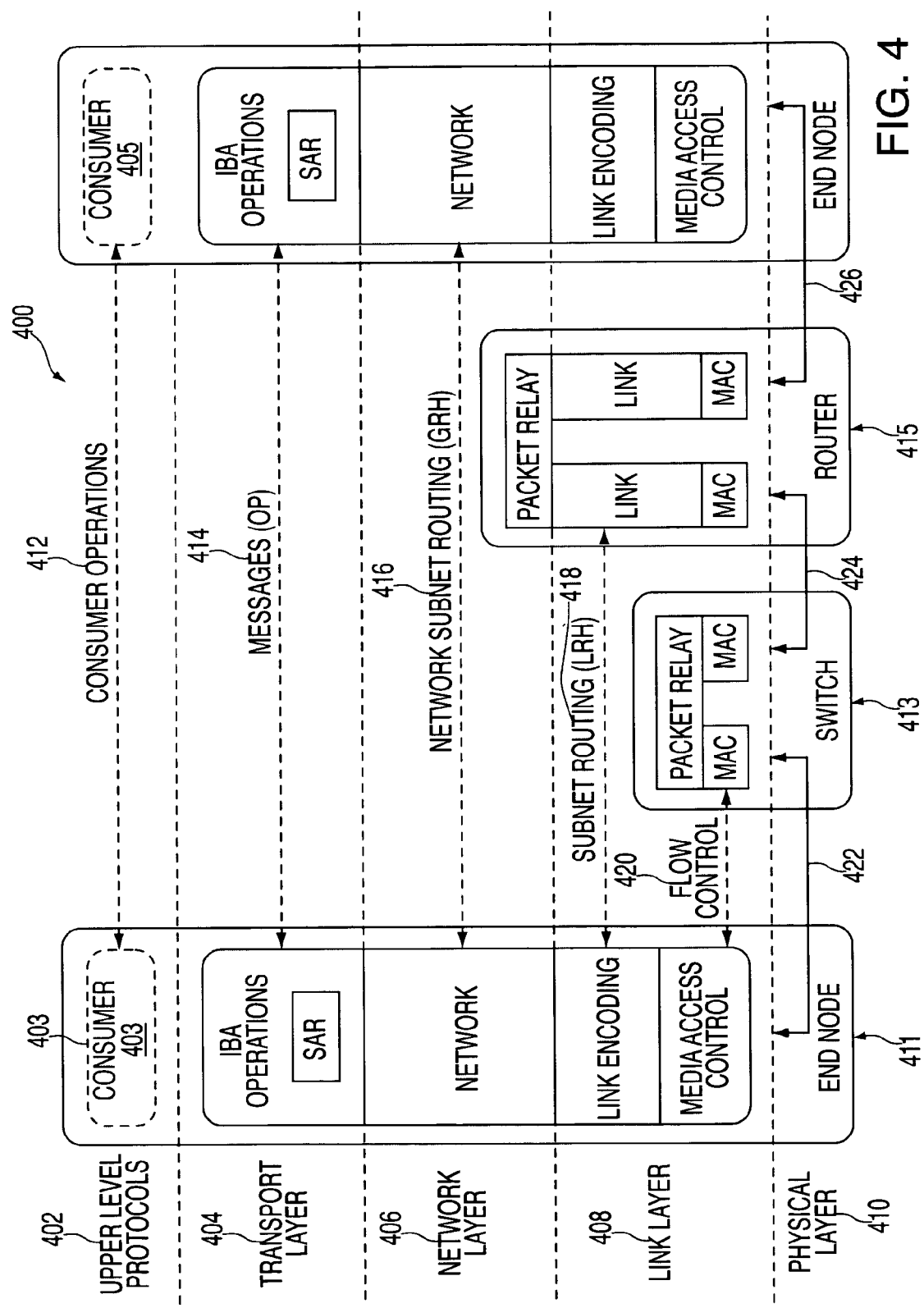
FIG. 4 is a diagram of a layered communication architecture in the prior art that is part of an exemplary operating environment for embodiments of the present invention.

One embodiment of a layered architecture 400 for implementing the present invention is generally illustrated in diagram form in FIG. 4. The layered architecture diagram of FIG. 4 shows the various layers of data communication paths, and organization of data and control information passed between layers.

Host channel adapter end node protocol layers (employed by end node 411, for instance) include an upper level protocol 402 defined by consumer 403, a transport layer 404; a network layer 406, a link layer 408, and a physical layer 410. Switch layers (employed by switch 413, for instance) include link layer 408 and physical layer 410. Router layers (employed by router 415, for instance) include network layer 406, link layer 408, and physical layer 410.

Layered architecture 400 generally follows an outline of a classical communication stack. With respect to the protocol layers of end node 411, for example, upper layer protocol 402 employs verbs to create messages at transport layer 404.

Network layer (406) routes packets between network subnets (416). Link layer 408 routes packets within a network subnet (418). Physical layer 410 sends bits or groups of bits to the physical layers of other devices. Each of the layers is unaware of how the upper or lower layers perform their functionality.

Consumers 403 and 405 represent applications or processes that employ the other layers for communicating between end nodes. Transport layer 404 provides end-to-end message movement. In one embodiment, the transport layer provides four types of transport services as described above which are reliable connection service, reliable datagram service, unreliable datagram service, and raw datagram service. Network layer 406 performs packet routing through a subnet or multiple subnets to destination end nodes. Link layer 408 performs flow-controlled, error checked, and prioritized packet delivery across links.

Physical layer 410 performs technology-dependent bit transmission. Bits or groups of bits are passed between physical layers via links 422, 424, and 426. Links can be implemented with printed circuit copper traces, copper cable, optical cable, or with other suitable links.

Embodiments of the present invention operate within the SAN environment described above with regard to FIGS. 1-4. FIGS. 5-10 show exemplary data structure embodiments of the present invention that used to implement a design complying with the InfiniBand™ specification of the Poll verb.

Figure 5:
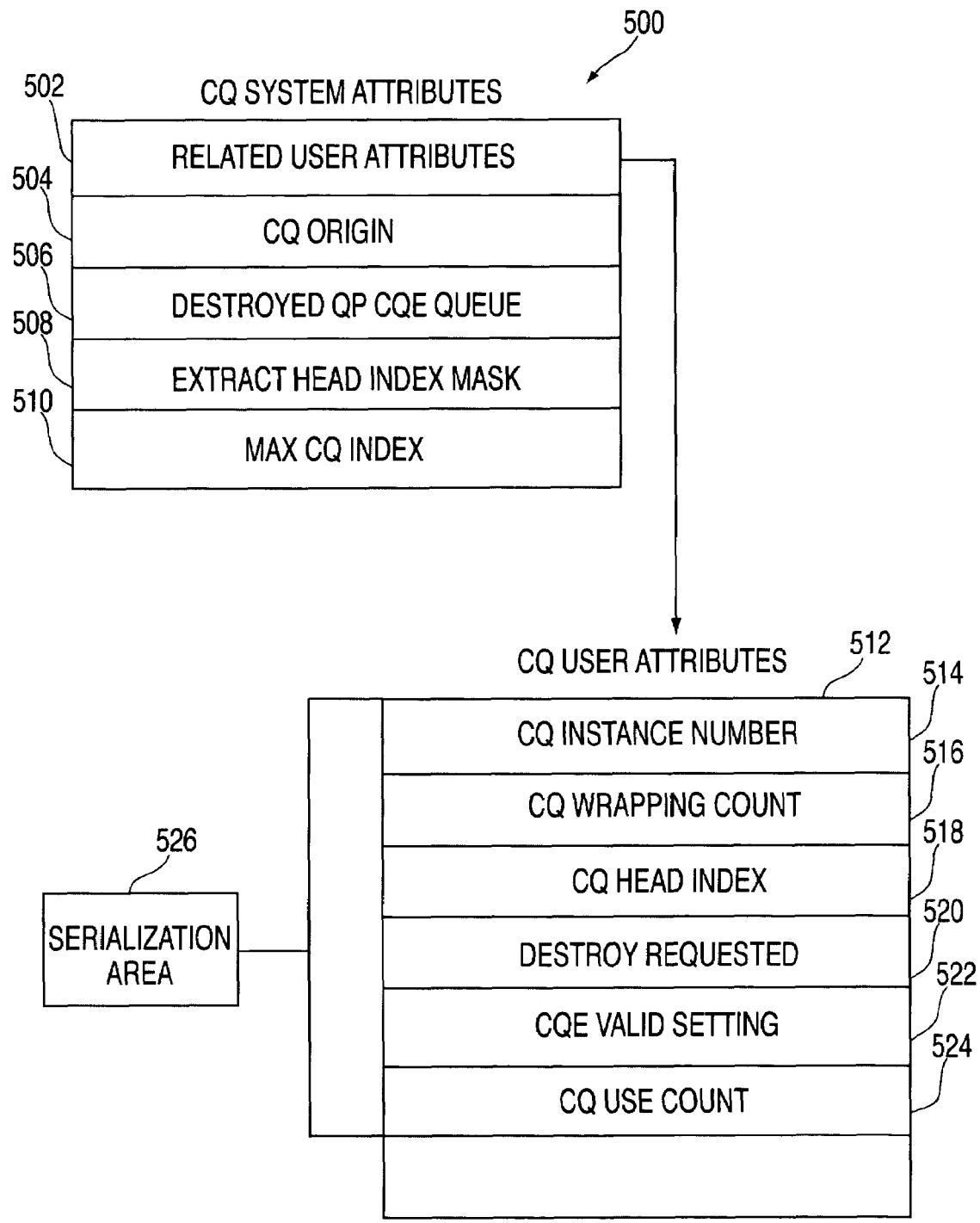
FIG. 5 is a block diagram of exemplary CQ system attributes and user attributes according to embodiments of the present invention.

FIG. 5 shows an exemplary data structure embodiment of CQ system attributes 500, including related user attributes 502, CQ origin 504, destroyed QP CQE queue 506, extract head index mask 508, and max CQ index 510. The related user attributes 502 points to the data structure CQ user attributes 512. CQ user attributes 512 has serialization area 526, which includes CQ instance number 514, CQ wrapping count 516, CQ head index 518, destroy requested 520, CQE valid setting 522, and CQ use count 524.

Figure 6:
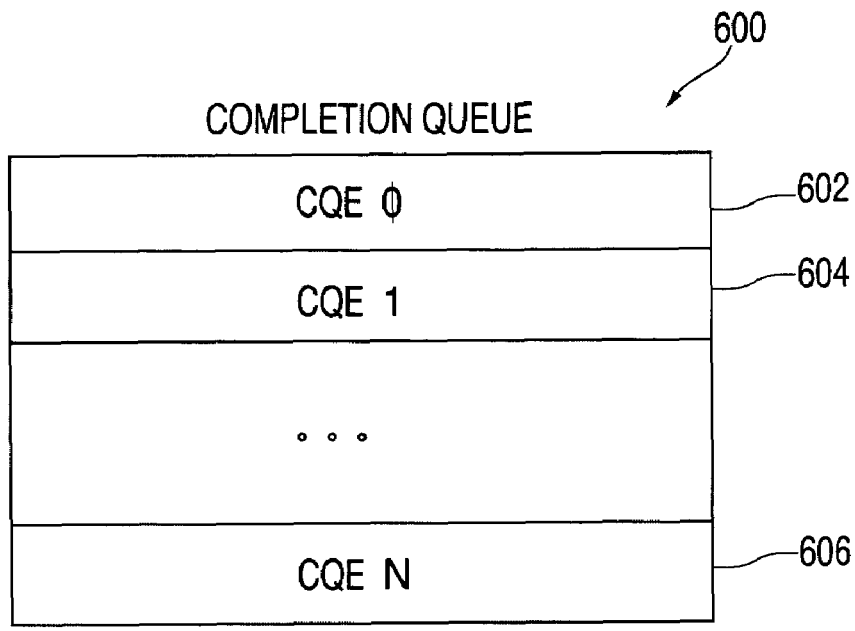
FIG. 6 is a block diagram of an exemplary completion queue according to embodiments of the present invention.

FIG. 6 shows an exemplary data structure embodiment of a completion queue 600 having n elements, {CQE 0, CQE 1, . . . CQE n}.

Figure 7:
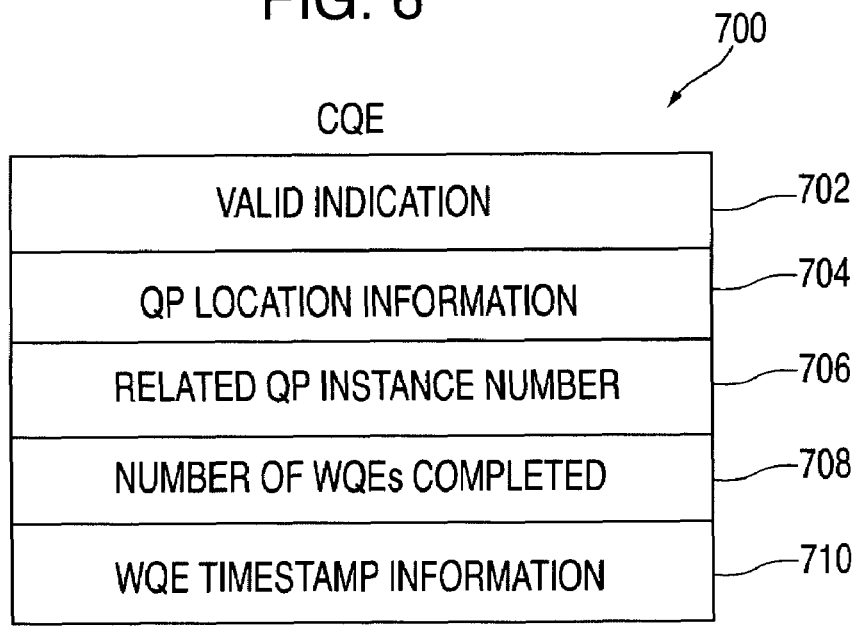
FIG. 7 is a block diagram of an exemplary CQE according to embodiments of the present invention.

FIG. 7 shows an exemplary data structure embodiment of a CQE 700, including valid indication 702, QP location information 704, related QP instance number 706, number of WQEs completed 708, and WQE timestamp information 710.

Figure 8:
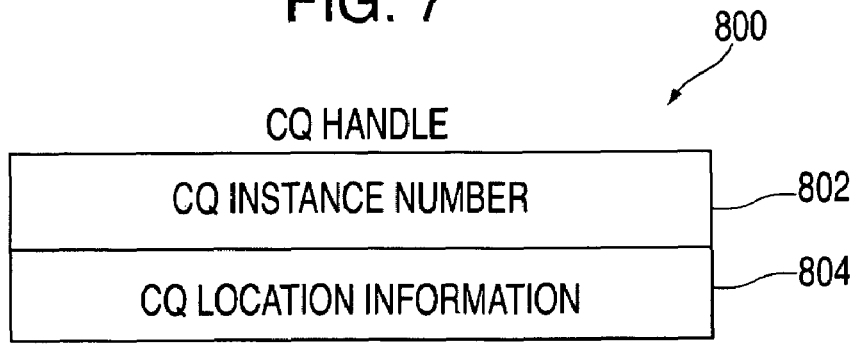
FIG. 8 is a block diagram of an exemplary CQ handle according to embodiments of the present invention.

FIG. 8 shows an exemplary data structure embodiment of a CQ handle 800, including CQ instance number 802 and CQ location information 804.

FIG. 9 shows an exemplary data structure embodiment of a HCA free CQ count register 900.

FIG. 10 shows exemplary data structure embodiment QP system attributes 1000, including QP instance number 1002 and related user attributes 1004. Related user attributes 1004 points to QP user attributes 1006, which includes serialization area 1008, free WQE count 1010, destroy QP requested 1012, QP instance number 1014, and timestamp requested 1016.

The exemplary data structures embodiments shown in FIGS. 5-10 may be stored in firmware, stored in computer-readable memory, such as memory 142, or stored on hardware, such as HCA 118. In one preferred embodiment, all the exemplary data structures are stored in computer-readable memory, except the HCA free CQ count register 900, which is stored on hardware.

Exemplary methods of using the exemplary data structure embodiments in FIGS. 5-10 to implement a design complying with the InfiniBand™ specification of the Poll verb are described below.

The InfiniBand™ architecture describes that a consumer must invoke the Create Completion Queue service prior to Create Queue pair, since a Queue Pair is affiliated with one or two Completion Queues (the Completion Queue specified for Send is allowed to be distinct from that for Receive). The Queue Pair facility supports the use of Send and Receive Queues to submit work requests. Once a work request is submitted, the consumer must take some action to become aware when the work request has completed and to learn the completion status. These latter capabilities are provided through the Poll interface.

During Create Completion Queue, the kernel allocates a Completion Queue 600 in system storage for the Host Channel Adapter (HCA) to use; thus these areas may not be updated by user mode programs, such as the Poll library service. The Completion Queue acts as a wraparound array which array that the HCA uses to store work completion information in entries called Completion Queue Entries (CQEs 700). The kernel allocates a system area control block 500 to describe the system state and attributes of the Completion Queue. In addition it allocates a user control block (CQ User Attributes 512) to maintain state information that is required to support Poll. The address of this user control block is maintained in a field (Related User Attributes 502) in the system control block. The system area control block is read-only to the library services that provide the Poll service, while the user control block is read-write to these services. One of the outputs from Create Completion Queue is the Completion Queue Handle 800. This handle is an input to the Poll library service. The handle serves as a lookup mechanism to access the system area control block (CQ System Attributes 500) for the Completion Queue. This allows validation that the consumer is permitted to use the resource and allows the library services to locate the user control block (CQ User Attributes 512) for the Completion Queue.

Within the user control block is a serialization area 526 which 526 that is accessed through Compare and Swap type instructions. The user control block Serialization Area 526 contains some of the same validation information as in the system area control block, together with state information (CQ Head Index 518) that locates the next Completion Queue Entry to be fetched to provide work status to the consumer. In addition there is an indication (Destroy Requested 520) which) that is set by Destroy Completion Queue (this is another InfiniBand™ verb service, but logically represents the operation of termination in the present disclosure) to prevent new access to the Completion Queue. A further field within this serialization area is a use count (CQ Use Count 524) which tracks the number of active threads, which wish to serialize with the library, services to access the Completion Queue.

After the Poll consumer library service verifies that the input Completion Queue handle is appropriate for use (using information in the system area control block), the user control block serialization area is atomically fetched. When the indication for Destroy Completion Queue is set (Destroy Requested 520) or the validation information (CQ instance number 514) is incorrect, the Poll operation is rejected. Otherwise the use count (CQ Use Count 524) in the serialization area is atomically updated to reflect use by the current thread while ensuring that no reasons for rejection exist.

The Poll library service now calculates where the next Completion Queue Entry is located (using CQ Origin 504 and CQ Head Index 518) and determines if that CQE is valid by comparing the validity setting in the CQE against the CQE Valid Setting 522 in the user control block. If the CQE is valid, Poll processing continues as described below. This disclosure requires that the HCA Driver (HCAD) software incurs no updates to the CQE as part of consuming a CQE. There is a technique used to allow the HCAD to determine when new CQEs have been added by the HCA without requiring the CQE to be updated by the HCAD. This is readily accomplished when the value that indicates whether a CQE is valid toggles when the end of the CQ is reached and the next free CQE becomes the first CQE in the Completion Queue. The current value for a valid CQE indication is maintained by the Poll service in the CQE Valid Setting 522 and this value is toggled (inverted) when the end of the CQ is reached.

When the next Completion Queue Entry is valid, Poll makes a copy of the Completion Queue Entry and then uses Compare and Swap against the user control block serialization area to take ownership of the entry. Part of the setup for this Compare and Swap operation is to advance the index for the next entry to be used (CQ Head Index 518) and to detect the condition that the last physical entry in the Completion Queue is being claimed (comparing against Max CQ Index 510). In this end of queue case, the next entry index (CQ Head Index 518) must be set to the beginning of the Completion Queue and the value of the CQE Valid Setting 522 must be inverted.

There is a further problem to be solved for small Completion Queues, which is that a thread could be stalled after fetching the Compare and Swap information. In this stalled period of time the Completion Queue may wrap back to the same point (Completion Queues are allowed to be as short as 64 entries, which allows a 1.5% random chance that the queue wraps back to the same point), so that when the thread awakens, the Compare and Swap would succeed without recognizing that the queue had changed. To address this exposure, when processing the last entry it is also necessary to increment a wrapping count (CQ Wrapping Count 516) for the Completion Queue which is kept in the user control block serialization area so that Compare and Swap by the reawakened thread will detect the wrap condition. The range of values for the wrapping count is larger for small Completion Queues and relatively smaller for large Completion Queues. To accommodate this diversity, it is convenient to set a mask, Extract Head Index Mask 508 in the system control block when the Completion Queue is created. This mask may be used to isolate the bits related to the wrapping count.

When the Compare and Swap is successful (normal case), the copied version of the CQE is used to provide return information to the Poll consumer. In fact, the copied version, not the CQE itself, must be used, as will be explained shortly. When the Compare and Swap is unsuccessful (abnormal case), the copied entry is ignored and Poll retries to the logic, which calculates the address of the next entry to use, as previously described.

When a valid entry was successfully claimed (Compare and Swap was successful), Poll updates the HCA register to reflect a new CQ free entry. Since the multi-threaded instances of Poll processing are not ordered in terms of their progress in processing, it is possible for instances which are processing later CQEs to perform this HCA register-update before the analogous update for earlier CQEs. Since the HCA writes new CQEs based on an internal cursor and the CQ free entry count, it is possible for the HCA to write new completion data to the same physical location as CQEs which are still being processed by other threads. This is why it is necessary for the HCAD to make a copy of the CQE prior to its Compare and Swap to claim software ownership. Once the Compare and Swap successfully claims an entry for software ownership, subsequent entries are eligible for possession. This behavior also mandates that the HCAD may not update the CQE, e.g. to reset a valid indication, after taking ownership. In order for an implementation to update the CQE after taking ownership, given an optimized HCA mode of operation, it would be necessary to disadvantageously obtain and release a lock among the Poll instances to preserve relative order of processing. This is readily accomplished when the value that indicates whether a CQE is valid toggles when the end of the CQ is reached and the next free CQE becomes the first CQE in the Completion Queue. The current value for a valid CQE indication is maintained by the Poll service in the CQE Valid Setting 522 and this value is toggled (inverted) when the end of the CQ is reached.

After updating the HCA free CQ entry count register, Poll processing updates software information for the related Queue Pair. This information includes the free WQE count 1010, which allows new work requests to be posted to the Work Queue whose completions we are processing. This update uses Compare and Swap type operations to validate that the Queue Pair is still associated with the work completion. Destroy Queue Pair may have run between the time that the work request was posted and the time that Poll processes the work completion. The Completion Queue Entry contains a token that represents the instance (Related QP Instance Number 706) of the Queue Pair; this instance number (QP Instance Number 1002) in the system related control block is changed by Destroy Queue Pair. Note that during Create Completion Queue processing, the kernel set up the Completion Queue to allow user mode access only when the caller was itself a user mode program. When Create Completion Queue was invoked by a system mode caller, user mode programs would not be allowed to update the HCA registers.

Once Poll processing is complete, the exit logic must cause the Serialization Area 526 in the user control block to be updated to reflect that the Polling thread is no longer active. This is performed using Compare and Swap type logic. When the extracted area reflects that a Destroy Completion Queue operation is pending (Destroy Requested 520), the last active thread is responsible for invoking a kernel function to unblock the Destroy Completion Queue operation.

Table 1, below, provides a detailed pseudocode description of an exemplary method embodiment of the disclosure. In the following detailed description, names such as old, new, oldpost, newpost refer to local variables of the size and format required to hold the data used to initialize these variables. In particular, old and new will be the size and format of the CQ user related Serialization Area 526, while oldpost and newpost will be the size and format of the QP user related serialization area 1008.

Table 1. Psuedo Code for an eExemplary Method Pseudocode
1. Find the system control block 500 for the CQ based on the input CQ handle (CQ Location Information 804)
2. Fetch address (Related User Attributes 502) of user control block for the CQ from the system control block 500
3. Copy the serialization area in the user related control block (Serialization Area 526) to old
4. Share SHARE CQ: Copy old to new
5. If the Destroy is requested (Destroy Requested 520) in the old version of the user control block or the old version of the CQ Instance Number 514 does not match the value in the input CQ handle (CQ Instance Number 802)
   a) Return directly to the caller indicating the CQ is not valid for Poll
6. Increment current CQ Use Count 524 in new version
7. COMPARE AND SWAP (old, new, user related serialization area 526)
8. If COMPARE AND SWAP fails, retry at Share SHARE CQ
9. Copy new into old
10. Fetch FETCH CQE: Copy old into new 11. Calculate the CQE 700 address based on the old version of the CQ head index 518 and the CQ origin 504 in the system related control block
12. If the head CQE is invalid (compare valid setting in new version—see CQE Valid Setting 522, against CQE Valid Indication 702)
    a) If the Destroyed QP CQE Queue 506 is non-empty
       (1) Invoke kernel service to remove an element from the Destroyed QP CQE Queue 506
       (2) If an element was returned, flow to QP PROCESSING logic
    b) Set return code=got none
    c) Flow to EXIT LOGIC to return to the caller
13. Copy the head CQE into the dynamic area before attempting to claim ownership
14. Copy new into old
15. Adjust new Head Index (see CQ Head Index 518) and Wrapping (see CQ Wrapping Count 516) values in new. Take wrapping into account (use Max CQ Index 510) and invert new valid CQE setting (CQE Valid Setting 522) when wrapping occurs.
16. COMPARE AND SWAP (old, new, user related serialization area 526)
17. If COMPARE AND SWAP fails
    a) If the CQ instance # in old (see CQ Instance Number 514) does not match the value in the input handle (CQ Instance Number 802)
       (1) Return directly to the caller indicating the CQ is not valid for Poll
    b) Retry at Fetch FETCH CQE
18. Set return code=got one
19. Write 1 to the Free Entry Count Adder in the HCA Free CQ Count Register 900.
20. QP PROCESSING: Calculate the address of the system control block (QP System Attributes 1000) describing the Queue Pair using the QP Location Information 704 in the dynamic area copy of the CQE.
21. If the QP Resource instance number (Related QP Instance Number 706) in the dynamic area copy of the CQE does not match the value (QP Instance Number 1002) in the system control block describing the Queue Pair
    a) Flow to EXIT LOGIC to provide copied CQE data to caller
22. Fetch the QP user related control block address (Related User Attributes 1004) from the system control block describing the Queue Pair
23. Set oldpost from the serialization area 1008 in user related QP control block
24. Update UPDATE QP: Copy oldpost to a version for update, newpost
25. If Destroy is requested (Destroy QP Requested 1012) in oldpost
    a) Flow to EXIT LOGIC to provide output CQE data to caller
26. If the QP token instance # value (Related QP Instance Number 706) in the dynamic copy of the CQE □^=Instance value in oldpost (see QP Instance Number 1014)
    a) Flow to Exit LogicEXIT LOGIC to provide output CQE data to caller
27. Increment the free count (see Free WQE Count 1010) in newpost by the number of WQEs that completed (see Number WQEs Completed 708).
28. If WQE timestamp is valid in dynamic copy of CQE (see WQE Timestamp Information 710)
    a) Set newpost timestamp requested=0 (see Timestamp Requested 1016)
29. COMPARE AND SWAP (oldpost, newpost, user related QP serialization area 1008)
30. If the compare failed, retry at Update UPDATE QP
31. EXIT LOGIC: Set old from the serialization area 526 in user related CQ control block (CQ User Attributes 512)
32. Unlock UNLOCK CQ: Copy old to new
33. If CQ instance number 514 in old does not match the value (CQ Instance Number 802) in the input CQ handle
    a) Return to caller with return code=CQ invalid for Poll
34. Decrement current use count (see CQ Use Count 524) in new
35. COMPARE AND SWAP (old, new, user related serialization area 526)
36. If COMPARE AND SWAP fails, retry at Unlock UNLOCK CQ
37. If new current use count=0 (see CQ Use Count 524) AND new Destroy requested (see Destroy Requested 520) is set
    a) Invoke kernel function to resume the Destroy Completion Queue
38. If Poll was successful, package up the output data for the caller
39. Return to caller with return code and when successful, output data In Table 1, the exemplary pseudocode has four different COMPARE AND SWAP operations (steps 7, 16, 29, and 35) that serialize different processes, dividing the pseudocode into four main sections. Also, there are six major blocks in the pseudocode: (1) steps 1-8, (2) steps 9-12, (3) steps 13-19, (4) steps 20-23, (5) steps 24-30, and (6) steps 31-39. In addition, there are labels for particular sections: SHARE CQ at step 4, FETCH CQE at step 10, QP PROCESSING at step 20, UPDATE QP at step 24, EXIT LOGIC at step 31, and UNLOCK CQ at step 32. The four main sections are generalized and then each step is described in detail below.

The first COMPARE AND SWAP at step 7 serializes the use of the completion queue with other functions, such as Destroy Completion Queue, which would otherwise remove the Completion Queue and discard those resources. This first serialization point ensures that once the Poll function starts to perform it is allowed to continue, because the resources have not been destroyed and will not be destroyed while this logic is in control. The current thread may have shared ownership with other threads, but the current thread cannot have shared ownership if another thread already has exclusive ownership, such as the Destroy Completion Queue verb.

The second COMPARE AND SWAP at step 16 serializes ownership of the CQ Head Index 518, which represents the current position of the index. The current position is the next place the software will fetch completions to be given back to the consumer application. This second serialization point basically serializes ownership of that index so that completions are uniquely delivered. This avoids the problem of having two different threads running a Poll simultaneously that both access the same index. Both of them might return the same completion to two different threads, which would be undesirable. This is an exclusive type operation.

The third COMPARE AND SWAP at step 29 serializes the updating of the number of free elements in a Queue Pair, i.e. Free WQE Count 1010. Again, this is an exclusive type operation.

The fourth COMPARE AND SWAP at step 35, which is after the EXIT LOGIC label, surrenders shared ownership of the Completion Queue so that it can go back to a state, possibly, where if it is not being used, it could be destroyed. Also, there is some cleanup logic for other events not recognized by the exiting thread while it was in control. These are responsibilities that other threads have passed to the exiting thread, which happened to be the last thread exiting from the Poll function, whenever the exiting thread causes the count to change from one to zero.

In more detail, starting at step 1, the system control block 500 is found. The CQ system attributes 500 in FIG. 5 correspond to the CQ handle 800 in FIG. 8. This control block, CQ system attributes 500, is created when the completion queue 600 is created. At this time, CQ User Attributes 512 is also created.

The QP system attributes 1000 and the QP user attributes 1006 in FIG. 10 are created by the Create Queue Pair verb. At the time a queue pair is created, there is an additional responsibility of designating one or two completion queues 600 where the completions for that queue pair are going to be recorded; for example, one completion queue may be designated for both send operations and receive operations.

Suppose a piece of information is sent over the SAN fabric 116 using a send operation through the Post verb, then a work element is built and put on the queue pair for the send operation and the completion appears on the designated completion queue 600 associated with that queue pair send queue. In summary, first completion queues 600 are setup and, later, the queue pairs are setup and, at the time that the queue pair is set up, a completion queue is designated to Poll from, where the results are returned. Thus, the first step is basically to fetch the CQ system attributes 500.

The second step is basically to find the CQ user attributes 512 from the CQ system attributes 500 using the pointer in related user attributes 502.

The third step extracts the serialization area 526, including the head index mask 508 from and this is copied into the variable called "old".

At step 4, initialization is performed for the COMPARE AND SWAP at step 7. The current value of the variable called "old" is extracted and copied to a variable called "new", giving two copies of the extracted value.

At step 5, it is determined whether activity is current for the completion queue 600, which would prevent Polls from being completed. For example, checking whether there is a destroy in progress (Destroy Requested 520) or whether there is any inconsistency in the state information for the completion queue 600, i.e., the CQ Instance Number 514 is not the same in the serialization area 526 as in the CQ Handle 800 (CQ Instance Number 802). If any of those problems arise, an indication that the completion queue 600 is not valid for the Poll is returned to the caller. Otherwise, control flows to step 6.

At step 6, CQ Use Count 524 in the new version is incremented to reflect the use of the current thread.

At step 7, the COMPARE AND SWAP is performed. If it fails, control flows from step 8 back to step 4 at the label SHARE CQ.

At step 9, the variable "new" is copied into the variable "old" to make sure they have the same value.

At step 10, "old" is copied into "new" for the retry case.

At step 11, it is determined where the completion queue element 700 is located for the current position of the index, the CQ head index 518. The virtual address of the current CQE 700 in the completion queue 600 is calculated by taking the CQ Origin 504 and adding to it the CQ head index 518 multiplied by the size of CQE. The information from the current CQE 700 will be extracted to return to the caller.

At step 12, if the Valid Indication 702 of the current CQE 700 is not valid, then there is no completion information to return other than a no completion status. While the queue pair has an operation outstanding, there might be an invocation of the Destroy Queue Pair verb, which would dismantle the resources associated with the queue pair. In particular, the QP System Attributes 1000 and the QP User Attributes 1006 blocks would no longer be present to use. Therefore, it is determined if any queue pairs were destroyed while completion information was outstanding for them. If that unlikely event happens, the Destroy Queue Pair verb saves simulated information about the completion on the Destroyed QP CQE Queue 506 associated with the Completion Queue(s) for the Send and Receive operations and a kernel service is invoked to fetch an element from the Destroyed QP CQE Queue 506, which is associated with the Completion Queue(s) for the Send and Receive operations, to return to the caller. When an element was returned, processing continues at QP PROCESSING at step 20. When the Destroy QP CQE queue is empty or no element was returned, a no completion status is returned to the caller by having control flow to the label EXIT LOGIC.

At step 13, the flow begins for the case where the current CQE, given by the CQ head index 518 is valid. Before returning the completion status, there is a race for ownership.

At step 14, in preparation for the COMPARE AND SWAP "new" is copied to "old", which relates to the serialization area 526.

At step 15, the CQ Head Index 518 is incremented in the "new" variable, taking into account that it may have wrapped. In the Completion Queue 600, wrapping occurs when the current index is the last index (N) and the next index is the first index (0). If wrapping occurred, the index in the "new" variable is changed to zero, rather than adding one to the old value. CQ Wrapping Count 516 is a mechanism for handling a small queue so that wrapping is more likely and another thread or series of threads might have claimed ownership of an element on the Completion Queue 600.

At step 16, a COMPARE AND SWAP is issued against the same serialization area 526 as before. In this case, rather than attempting to update the use count, the CQ Head Index 518 and CQ Wrapping Count 516 are updated.

At step 17, if the COMPARE AND SWAP fails, then something has changed in the serialization area 526, or another thread has claimed ownership of the current CQE, or another state change has happened. If the CQ Instance Number 514 in the CQ System Attributes 500 is different than CQ Instance Number 802 in the CQ Handle 800, then control is returned immediately to the caller with an indication that the Completion Queue 600 is not valid for the Poll operation. In all other cases, if the COMPARE AND SWAP failed, control flows to the FETCH CQE label at step 10.

At step 18, a CQE will be returned to the caller with a successful status, upon completion of the following steps.

At step 19, the HCA Free CQ Count Register 900 is updated, which indicates the number of free elements on the Completion Queue 600 that are available to the hardware. It is possible that there is a delay at this point and there are other threads claiming ownership of other elements further down in the queue. For example, if this thread claimed ownership of element one in the Completion Queue 600, there might be completion events in elements two and three. Those other threads might be independently executing this same logic, including incrementing the CQ Head Index 518 and incrementing the HCA Free CQ Count Register 900. As a result, the HCA might change the contents of a free CQE, which might, in fact, be the CQE claimed by the current thread, element one. That is why a copy of the CQE was made at step 13.

At step 20, ownership has been claimed of the CQ Head Index 518 and a copy is in dynamic storage of the completion status for returning to the caller. The following steps will update queue pair state information associated with the owned CQE 700, whose completion status will be returned to the caller. QP Location Information 704 in the CQE 700 is used to calculate the address of QP System Attributes 1000 for the queue pair associated with CQE 700.

At step 21, Related QP Instance Number 706 is compared to QP Instance Number 1002. It is possible, for example, that the queue pair was destroyed and the instance number was changed. In that case, control flows to the label EXIT LOGIC at step 31.

At step 22, the address of the QP User Attributes 1006 is extracted from the Related User Attributes 1004 in the QP System Attributes 1000 in order to determine the Free WQE Count 1010. The work queue is tracked by QP System Attributes 1000 and QP User Attributes 1006. The work queue has elements (WQEs) that correspond to requests to send or receive data.

At step 23, the serialization area 1008 is extracted from the QP User Attributes 1006, rather than from the CQ User Attributes 512. This value is copied to a variable called "oldpost".

At step 24, "oldpost" is copied to "newpost".

At step 25, it is determined whether there is a Destroy QP Requested 1012. If so, control flows to the label EXIT LOGIC at step 31

At step 26, the Related QP Instance Number 706 in the CQE 700 is compared to QP Instance Number 1014 in the QP User Attributes 1006. If they are different, then control flows to the label EXIT LOGIC at step 31.

At step 27, the Free WQE Count 1010 in "newpost" is incremented by the Number WQEs Completed 708 in CQE 700. Multiple completion events can be rolled into a single CQE 700.

At step 28, If WQE Timestamp Information 710 in the dynamic copy of the CQE 700 is valid then the Timestamp Requested 1016 in the QP User Attributes 1006 for the "newpost" copy is cleared (set to zero). WQE Timestamp Information 710 indicates to the caller how long his work request took.

At step 29, the COMPARE AND SWAP is performed in the QP User Attributes Serialization Area 1108. In case another thread was changing the current value of the "newpost" Timestamp Requested 1016, the current value of the "Newpost" Free WQE Count 1010, or another field, there would be a COMPARE AND SWAP failure.

At step 30, upon failure control flows to label UPDATE QP at step 24.

Various steps above branch to the EXIT LOGIC label at step 31. The "old" variable from the serialization area 526 in CQ User Attributes 512 is set.

At step 32, the "old" variable is copied to the "new variable".

At step 33, it is determined whether there was some intervention; such as the Destroy CQ function has changed the instance number. If CQ Instance Number 514 does not match CQ Instance Number 802, then a failure return code is returned to the caller. The usual case is that there was no such intervention.

At step 34, the "new" CQ Use Count 524 in serialization area 526 is decremented.

At step 35, COMPARE AND SWAP is performed to signal the current thread is no longer using the Completion Queue 600 or related control structures 500 or 512.

At step 36, control flows to label UNLOCK CQ at step 32, upon failure, which might occur if, for example, another Poll thread is performing these same steps or a Destroy QP function is coming in.

At step 37, if the "new" CQ User Count 524 is zero and Destroy Requested 520 is set, then the kernel function to resume the Destroy Completion Queue is invoked. This would occur if the current thread were the last thread to exit and also the Destroy Completion Queue has been requested.

At step 38, output data is packaged, such as the number of bytes transferred.

At step 39, the Poll completion status is returned to the caller and, when successful, output data for the completion is returned.

Exemplary embodiments of the present invention have many advantages. Embodiments provide Poll support in the HCAD, which may be invoked in a multi-threaded environment, without the use of serialization techniques, such as locks and latches, or other services that require entry into the kernel. Poll processing is also serialized with kernel implemented destroy completion queue and destroy completion QP operations. As a result, a user mode program may process completions for work requests while in user mode, i.e., with no kernel intervention, running enabled with no locks or latches. As a result, there are fewer instructions executed and fewer resources consumed, improving performance.

Another advantage is that the compare and swap machine instruction, judiciously applied, avoids linkage costs and state transition costs. This instruction allows serialize state changes atomically and without the overhead of using the operating system. It also allows the multithreading, which is highly desirable in a large server environment.

Another advantage has to do with the interaction between the exemplary pseudocode that performs the Poll function and other verbs, which are privileged operations, such as Destroy Completion Queue and Destroy Queue Pair. The exemplary pseudocode solves the problem of how to serialize events or activities that are taking place in the unauthorized environment for the Poll verb and, at the same time, serialize with the operating system, which is privileged and running on different threads. Not only does the exemplary pseudocode serialize multiple threads trying to Poll on the same queue at the same time, but also serializes with operating system functions invoked on other threads and that use the same resources that Poll was trying to access. Non-privileged exemplary embodiments protect themselves from the privileged operating system by notifying the operating system when resources are being accessed so they are not discarded by the operating system while the exemplary embodiments are trying to use them. This avoids an integrity problem of attempting to access resources that belong to another user because they were reassigned.

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for lockless InfiniBand™ Poll for I/O completion, comprising:
   providing shared access to completion queue resources for multiple concurrent threads performing Poll logic; and
   determining if any thread is attempting to destroy the completion queue resources and, if so, returning an error status; and
   synchronizing host channel adapter driver (HCAD) software with host channel adapter (HCA) hardware;
   wherein serialization for the mainline Poll logic is provided without using kernel services;
   wherein the Poll logic serializes any of the multiple concurrent threads attempting to concurrently Poll on a given query, and the Poll logic also serializes with one or more operating system functions invoked on at least one other thread that uses at least one resource that the Poll logic is attempting to access for the given query;
   wherein the HCAD software provides poll support invoked in a multi-threaded environment without using serialization techniques that require entry into a kernel, and the poll logic is serialized with a kernel implemented destroy completion queue and destroy completion operations such that a user mode program processes completions for work requests while in user mode with no kernel intervention, running enabled with no locks or latches.

2. The method of claim 1, wherein a single atomic operation both serializes a current thread with other polling threads.

3. The method of claim 1, wherein the completion queue resources include a completion queue element and further comprising:
   copying the completion queue element, before ownership is obtained and, as once ownership is obtained, no longer providing access to the completion queue element.

4. The method of claim 1, wherein the completion queue resources include a completion queue element and the completion queue element is available for reuse, without requiring an update by the HCAD software.

5. The method of claim 1, further comprising:
   synchronizing a HCA free entry count with a consumer software program without requiring any software locking overhead.

6. The method of claim 1, further comprising:
   wrapping count addresses timing windows for small completion queue configurations.

7. The method of claim 1, using compare and swap operations.

* * * * *